United States Patent Office 3,772,254
Patented Nov. 13, 1973

---

3,772,254
ENDO ALICYCLIC END CAPPED
POLYIMIDE RESINS
Robert J. Jones, Hermosa Beach, and Eugene A. Burns, Palos Verdes Peninsula, Calif., assignors to TRW Inc., Redondo Beach, Calif.
No Drawing. Filed Apr. 3, 1972, Ser. No. 240,768
Int. Cl. C08g 20/32
U.S. Cl. 260—78 TF          7 Claims

ABSTRACT OF THE DISCLOSURE

Polyimide resins having high temperature stability can be made by curing chemically stable alicyclic endo end capped aromatic prepolymers. The prepolymers can be made by reacting proper stoichiometric amounts of an aromatic tetracarboxylic acid or derivative with an aromatic diamine or diisocyanate, and an end capping compound having the formula:

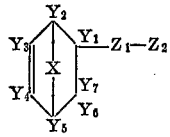

wherein $Y_1$–$Y_6$, inclusive, can be hydrogen, halogen, nitro, aryl, alkyl, alkyl ether, or alkyaryl; X can be carbonyl, oxygen, sulfur, methylene, halogen substituted methylene, alkyl substituted methylene, or aryl substituted methylene; $Z_1$ can be an arylene or an alkylene group having 0 to 4 carbon atoms; $Z_2$ is an amine or an isocyanate, and $Y_7$ can be hydrogen, halogen, nitro, aryl, alkyl, alkyl ether, alkaryl, or amino in a stable combination with $Y_6$. The end capping compound can be synthesized by reacting a cyclo diolefin with an olefinic compound according to Diels-Alder reaction.

BACKGROUND OF THE INVENTION

The present invention relates to stable, high temperature aromatic resins. Resins, according to this invention, are produced by a pyrolytic polymerization of prepolymers having reactive terminals groups. Pyrolytic polymerization is the coreaction of the reactive groups located at the terminal ends of the prepolymer upon heating at elevated temperature to cause chain extension and cross-linking of the prepolymer segment.

Polyimide resins have been produced by the pyrolytic polymerization reaction of a polyimide prepolymer having end caps of bicyclo (2.2.1) hept-5-ene-2,3-anhydride as disclosed in U.S. Pat. 3,528,590. The polyimide prepolymer was produced by reacting a diamine with a dianhydride and end capping the chain with a monoanhydride having the structure:

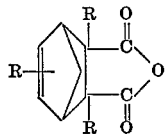

where R is hydrogen or an alkyl group.

Synthesis of compounds similar to the alicyclic endo compounds used herein have been disclosed by Diels and Alder in U.S. Pat. 1,944,731. These compounds are produced by reacting a diene with a dienophile to produce a six membered ring compound.

SUMMARY OF THE INVENTION

The high temperature aromatic polyimide resins of this invention are produced by reacting an aromatic diamine or diisocyanate with an aromatic tetracarboxylic acid or derivative and end capping the polymer chain with a substitute alicyclic endo compound. The polymer chain which is produced by reacting proper stoichiometric amounts of the dianhydride or tetracarboxylic acid and a diamine or diisocyanate is end capped with a substituent alicyclic endo compound having the formula:

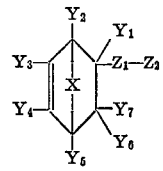

wherein $Y_1$–$Y_6$, inclusive, may be selected from hydrogen, halogen, nitro, aryl, alkyl having 1 to 6 carbon atoms, alkyl ether having 1 to 6 carbon atoms, or alkaryl; X may be selected from any of carbonyl, oxygen, sulfur, methylene, halogen substituted methylene, alkyl substituted methylene, or aryl substituted methylene; $Z_1$ is an arylene or an alkylene radical having 0 to 4 carbon atoms; $Z_2$ may be selected from either of: $-NH_2$ or $-N=C=O$, and $Y_7$ can be selected from any of hydrogen, halogen, nitro, aryl, alkyl, alkyl ether, alkaryl, or amino.

The end capping endo compound is produced by a Diels-Alder reaction wherein a cyclo diolefin having a formula:

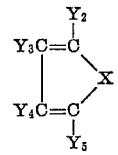

wherein $Y_2$–$Y_5$, inclusive, may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene, and aryl substituted methylene is reacted with an olefinic compound having the formula:

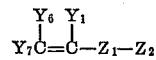

wherein $Y_1$ and $Y_6$ may be selected from any of hydrogen, halogen, nitro, aryl, alkyl having 1 to 6 carbon atoms, alkyl ether having 1 to 6 carbon atoms, alkaryl; $Y_7$ may be selected from any of halogen, nitro, aryl, alkyl, alkyl ether, alkaryl, and amino; $Z_1$ is an arylene or an alkylene radical having 0 to 4 carbon atoms; and $Z_2$ may be selected from either of $-NH_2$ or $-N=C=O$.

The prepolymers of this invention may be made by reacting a tetracarboxylic acid or dianhydride with a diisocylanate or a diamine, and end capping the prepolymer with an alicyclic endo compound. The prepolymer which may be produced by the reaction of the dianhydride with a diamine or a diisocyanate may be illustrated ideally as follows:

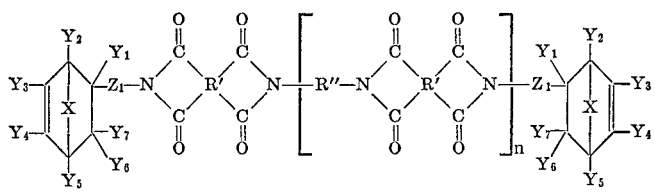

R' is a tetravalent aromatic radical, R" is a divalent aromatic radical, and the $n$ is an integer from 1 to 20.

Product properties of the cured polymer can be enhanced by the inclusion of olefinic crosslinking agents in amounts up to about 10% by weight of the resin at initiation of cure.

DISCLOSURE OF THE INVENTION

High temperature polyamide resins can be made by curing prepolymers prepared by reacting proper stoichiometric amounts of an aromatic tetracarboxylic acid or derivative with an aromatic diamine or diisocyanate and end capping the prepolymer with an alicyclic endo compound. The prepolymers are characterized in that they are shelf-stable solids which react through the alicyclic endo compound to form a polymer having good properties in the temperature range of 280° C–500° C. One of the chief advantages of these resins, in addition to their excellent physical and thermal properties, is the relative ease with which laminated or molded articles may be fabricated from them. Thus, rather than fabricating articles from a liquid resin, fabricators may form the solid prepolymers of this invention from the liquid starting materials and fabricate the articles from a dry or slightly tacky prepolymer. The savings in cleanup time and materials is substantially without sacrifice of product properties.

Alicyclic endo end cap compounds are synthesized by reacting a cyclodiolefin having the formula:

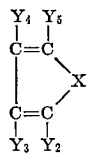

wherein $Y_2$–$Y_5$, inclusive, may be selected from any of hydrogen, halogen, nitro, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene, and aryl substituted methylene, with an olefinic compound having the formula:

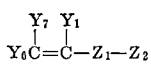

wherein $Y_6$ and $Y_1$ is selected from the same groups represented by $Y_2$–$Y_5$; $Y_7$ is selected from the groups as represented by $Y_2$–$Y_5$ and, additionaly, may be an amino radical; $Z_1$ is either an arylene or alkylene radical having 0 to 4 carbon atoms; and $Z_2$ may be selected from either —$NH_2$ or —N=C=O. Ideally, the reaction may be represented as follows:

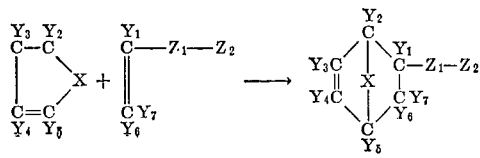

wherein $Y_1$–$Y_7$, X, $Z_1$ and $Z_2$ have been identified above. The reaction is carried out in a liquid solvent, such as benzene, and temperatures of the reaction may range from room temperature to about 200° F.

Special note should be made of the alicyclic endo amine compound because it can be synthesized, for instance, by the Curtius reaction, rather than by Diels-Alder reaction. According to Curtius reaction, an alicyclic endo acid or derivative is reacted with ammonium, hydrazine, or sodium azide according to the following reaction:

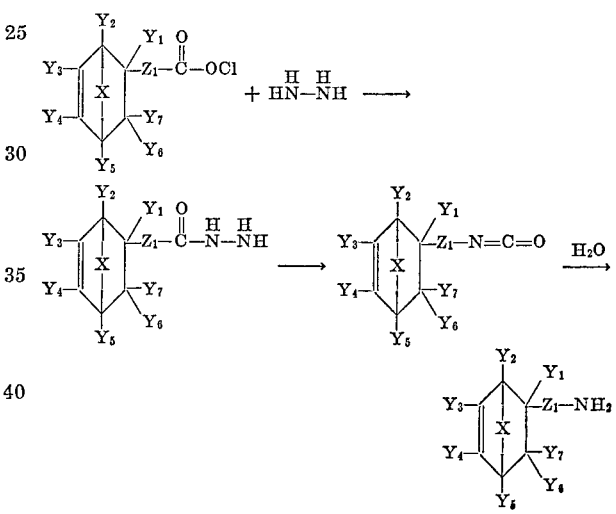

The following table provides a list of a few of the representative cyclodiolefin compounds which are suitable for reaction to produce the alicyclic endo end cap compounds.

TABLE I furane
cyclopentadieneone
3,4-diphenylthiophene
cyclopentadiene
methylcyclopentadiene
1,1,2,3,4,5-hexachlorocyclopentadiene The folowing table provides a list of a few of the representative olefinic compounds which are suitable for reaction to produce the alicyclic endo end cap compound.

TABLE II 2,3,3-trichloro-3-aminoallyl
3-isocyanate allyl
4-amino-1-butylene
allyl amine One of the resins according to this invention may be produced by reacting proper stoichiometric amounts of an aromatic diamine with an alicyclic endo mono amine at temperatures ranging from about 10° C. to about 200° C., and subsequently, or simultaneously, the mixture is reacted with an aromatic dianhydride in the presence of a dehydrating agent at temperatures ranging from about −18° C. to about 200° C. The reaction may be illustrated ideally as follows:

1-isopropyl-2,4-metaphenylene diamine
m-xylylene diamine

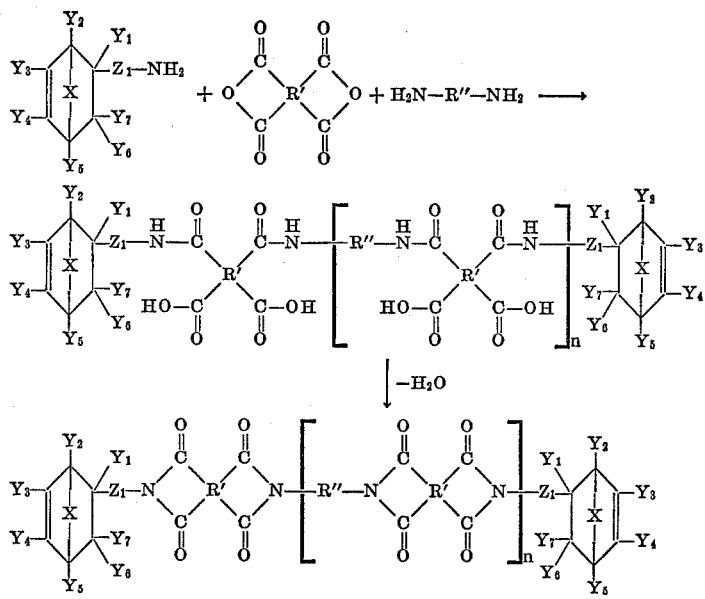

wherein $Z_1$, $Y_1-Y_7$, and X have been previously identified, R' is a tetravalent aromatic radical, R" is a divalent aromatic radical, and $n$ is an integer from 1 to 20. The end cap compounds may be the same or different alicyclic endo amines or isocyanates. As an alternative, up to about 50% of the alicyclic endo mono amine or isocyanate can be replaced by 4-amino-1-butylene which, in effect, would produce a prepolymer having an olefin radical as one of the end capped groups.

When amines are used, closure of the imide ring is effected by dehydrating in situ, i.e., simultaneously with the reaction of the constituents. The ring closure and prepolymer formation reactions must be carried out at temperatures below the polymer reaction temperature, i.e., below about 230° C.

While the prepolymers may be synthesized from any aromatic diamine or diisocyanate and any aromatic dianhydride or tetracarboxylic acid, the compounds must be capable of reacting together and must remain stable at 370° C. once they have reacted. Examples of several specific diamine compounds are listed in the following table:

TABLE III para-phenylene diamine
meta-phenylene diamine
1,3-(4-aminophenyl) propane
4,4'-diamine-diphenyl methane
2,4-diamino pyridine
2,6-diamino pyridine
1,2-(4-amino phenyl) ethane
benzidine
4,4'-diamino-diphenyl sulfide (4,4'-thiodianiline)
4,4'-diamino-diphenyl sulfone
3,3'-diamino-diphenyl sulfone
4,4'-diamino-diphenyl ether (4,4'-oxydianiline)
1,5'-diamino-naphthalene,3,3'-dimethyl-4,4'-biphenyl diamine
3,3'-dimethoxy benzidine
2,4-bis(beta-amino-t-butyl) toluene
bis-(para-beta-amino-t-butyl-phenyl) ether
bis-(para-beta-methyl-delta-amino-pentyl) benzene
bis-para-(1,1-dimethyl-5-amino-pentyl) benzene Examples of several specific diisocyanates are listed in the following table:

TABLE IV 2,4-toluene diisocyanate
2,6-toluene diisocyanate
dianisidine diiisocyanate
1,4-benzene diisocyanate
p,p'-diisocyanate diphenyl methane
1-chlorophenyl-2,4-diisocyanate
xylene diisocyanate
1,5-naphthalene diisocyanate Examples of several specific dianhydrides are listed in the following table:

TABLE V pyromellitic dianhydride
benzophenone tetracarboxylic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2'3,3'-diphenyl tetracarboxylic dianhydride
2,2-bis(3,4-dicarboxyphenyl) propane dianhydride
bis(3,4-dicarboxyphenyl) sulfone dianhydride
3,4,9,10-perylene tetracarboxylic dianhydride
bis(3,4-dicarboxyphenyl) ether dianhydride
naphthalene-1,2,4,5-tetracarboxylic dianhydride
naphthalene-1,4,5,6-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl) propane dianhydride
1,1-bis(2,3-dicarboxyphenyl) ethane dianhydride 1,1-bis(3,4-dicarboxyphenyl) ethane dianhydride
bis(2,3-dicarboxyphenyl) methane dianhydride
bis(3,4-dicarboxyphenyl) methane dianhydride
bis(3,4-dicarboxyphenyl) sulfone dianhydride
bis(3,4-dicarboxyphenoxyphenyl) sulfone dianhydride
benzene-1,2,3,4-tetracarboxylic dianhydride
thiophene-2,3,4,5-tetracarboxylic dianhydride It is to be understood that the tetracarboxylic acids, the esters and half esters of the dianhydrides listed in Table V will be equally as suitable for use in the present invention. The ester and half ester substituents may be selected from aromatic, e.g. phenyl, or aliphatic, e.g. 1 to 4 carbon atoms, groups. As used in this context, the expression ester means that all four tetracarboxylic acid groups have aromatic or aliphatic substituent groups, while half ester means that only two of the tetracarboxylic acid groups have aromatic or aliphatic substituent groups.

Reaction of the prepolymer to form the polymeric product occurs through the alicyclic endo end capping compounds. While the exact mechanism of the polymeric reaction is not known, it is postulated that a three-dimension polymer is formed when the prepolymer is subjected to temperature from approximately 230° C. to 370° C. for up to 4 hours. Although it is not necessary for cure, it has been discovered that the application of up to 700 atmospheres is beneficial in removing voids with the resultant improvement in product properties. The cure times, temperatures, and pressures are variables which depend on the composition, mass, and shape of the article being produced. For example, the cure for large mass of neat resin may require a lower temperature applied for a longer period of time at a higher pressure in order to avoid cracking, incomplete consolidation, or voids, than a thin impregnated glass laminated article or a small article containing up to 80% by weight of inert fillers, such as inorganic salts, metals, or other common filler materials.

While it is preferred that the terminal groups used on the prepolymers of this invention constitute only the alicyclic endo compounds, it has been found that up to about one half of the alicyclic endo compound can be replaced by an olefinic compound, such as allyl amine, without materially altering the properties of many of the polymers. Ideally, this provides a prepolymer with an allyl amino radical end cap at one end of the prepolymer chain and an alicyclic endo end cap at the other.

In order to enhance product properties, crosslinking agents may be incorporated into the polymer chain. Solid or liquid organic compounds having olefinic unsaturation can be added to the initial starting materials, while gaseous organic olefins are introduced into the starting material by reaction under pressure up to about 3000 p.s.i. Normally, an amount of crosslinking agent equivalent up to 10% by weight of resin at initiation of cure is used. Specific examples of a few of the gaseous olefinic compounds which are suitable crosslinking agents are ethylene, propylene, halogenated ethylene, halogenated propylene, and halogenated butadiene. Specific examples of liquid olefinic compounds which are suitable crosslinking agents are styrene, cyclopentadiene, furane, crotonic acid, acrylic acid and halogenated, phenyl substituted, or methyl substituted forms thereof. Specific examples of a few of the solid olefinic compounds which are suitable crosslinking agents for purposes of this invention are tetraphenylcyclopentadiene, maleic acid, citraconic acid and derivatives, cinnamic acid, and stilbene. In addition to the gaseous, liquid, or solid crosslinking agents, crosslinking sites may be built into the polymer chain by the use of polymer reactants having olefinic substituents; for example, a polyimide made from diamino styrene and stilbene dianhydride. Furthermore, it should be readily apparent to those skilled in the art that various combinations of the above crosslinking agents may be used.

The following example will help to illustrate the invention further.

PREPARATION OF THE END CAP

Example 1

Approximately 6.5 grams of cyclopentadiene are dissolved in 20 grams of benzene. Approximately 5.7 grams of allyl amine is added to the solution and mixed thoroughly. The solution is warmed slightly and stirred for 12 hours. Crystals of 2,5-endomethylene-1,2,5,6-tetrahydrobenzylamine precipitate from the solution.

PREPARATION OF THE PREPOLYMER AND POLYMER

Example II

Approximately 24.5 grams of 2,5-endomethylene-1,2,5,6-tetrahydrobenzylamine, approximately 1.9 grams of benzidine, and approximately 4.5 grams by pyromellitic dianhydride are slurried in 300 ml. of dimethylformamide. The resulting mixture is stirred for 3 hours to give a solution of amide-acid prepolymer. The dimethylformamide varnish is stripped of solvent by evaporation on a rotary evaporator under vacuum at 150° C. to give a dry powder. A ceramic dish containing the powder is placed in an oven at 300° C. for 30 minutes and then cooled to room temperature. A brown, rigid, thermoset polymer is formed.

PREPARATION OF THE ISOCYANATE END CAP

Example III

Approximately 12.5 grams of 2,5-endomethylene-1,2,5,6-tetrahydrobenzylamine and approximately 9.9 grams of carbonyl chloride are slurried in 350 ml. of dimethylformamide. Approximately 10 grams of sodium bicarbonate is added to the solution. The resulting mixture is heated to about 50° C. and is stirred fo about 10 hours. Crystals of 2,5-endomethylene - 1,2,5,6 - tetrahydrobenzylisocyanate precipitated from the solution.

PREPARATION OF PREPOLYMER AND POLYMER

Example IV

Approximately 30 grams of 2,5-endomethylene-1,2,5,6-tetrahydrobenzylisocyanate, approximately 1.6 grams of 1,4-benzenediisocyanate, and approximately 5.6 grams of benzophenone tetracarboxylic dianhydride are slurried in 400 ml. of dimethylformamide. The resulting mixture is heated to about 50° C. and is stirred for about 4 hours. The solvent was stripped and the polymer cured substantially according to Example II, above, to give a rigid, thermoset polymer.

We claim:
1. A method of making a polyimide prepolymer comprising reacting proper stoichiometric amounts of
   (A) an aromatic compound containing two functional nitrogen substituents selected from the group consisting of aromatic diamines and aromatic diisocyanates;
   (B) an aromatic compound containing functional tetracarboxylic groups capable of reacting with said nitrogen substituents selected from the group consisting of aromatic tetracarboxylic acids, aromatic dianhydrides, phenyl esters, phenyl half esters, and $C_1$ to $C_4$ aliphatic esters and half esters; and
   (C) an end cap compound comprising a substituted alicyclic endo compound having the formula:

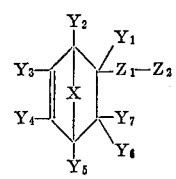

to give a prepolymer having 1 to 20 repeating units, wherein $Y_1$–$Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, oxygen, sulfur, methylene, halogen substituted methylene, alkyl substituted methylene, and aryl substituted methylene; $Z_1$ is selected from the group consisting of an alkylene radical having 0 to 4 carbon atoms and an arylene radical; $Z_2$ is selected from the group consisting of —$NH_2$ and —N=C=O; and $Y_7$ is selected from the group consisting of hydrogen, halogen, nitro, aryl, alkyl having 1 to 6 carbon atoms, alkyl ether having 1 to 6 carbon atoms, alkaryl, and amino at temperatures ranging from about 10° C. to about 200° C.; and (D) dehydrating with a dehydrating agent at temperatures ranging from about −18° C. to about 200° C.

2. A method of making a prepolymer according to claim 1 wherein up to about 50% of one of the end cap compounds is replaced by allyl amine.

3. A thermosetting polyimide prepolymer having the formula:

wherein R' is a tetravalent radical selected from the group consisting of aliphatic and aromatic; R'' is a divalent radical selected from the group consisting of aliphatic and aromatic; $Y_1$–$Y_6$, inclusive, are selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, oxygen, sulfur, methylene, halogen substituted methylene, alkyl substituted methylene, and aryl substituted methylene; $Z_1$ is selected from the group consisting of an alkylene radical having 0 to 4 carbon atoms and an arylene radical; $Z_2$ is selected from the groups consisting of —$NH_2$ and —N=C=O; $Y_7$ is selected from the group consisting of hydrogen, halogen, nitro, aryl, alkyl having 1 to 6 carbon atoms, alkyl ether having 1 to 6 carbon atoms, alkaryl, and amino, and $n$ is an integer from 1 to 20.

4. A prepolymer according to claim 3 wherein up to 50% of one of the end cap compounds is replaced by allyl amine.

5. A method of making a prepolymer according to claim 1 wherein an olefinic crosslinking agent is added.

6. A resin product comprising curing the prepolymer of claim 3.

7. A resin product comprising curing the prepolymer of claim 4.

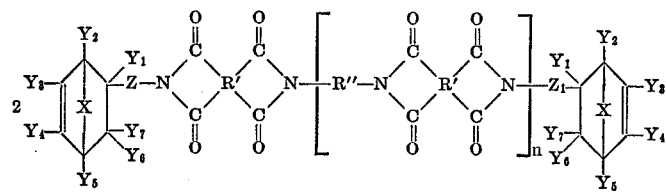

References Cited
UNITED STATES PATENTS

| | | | |
|---|---|---|---|
| 3,525,713 | 8/1970 | Bloch et al. | 260—47 |
| 3,528,950 | 9/1970 | Lubowitz | 260—78.4 |
| 3,565,549 | 2/1971 | Lubowitz et al. | 117—126 |
| 3,708,370 | 1/1973 | Lubowitz et al. | 156—331 |
| 3,708,459 | 1/1973 | Lubowitz | 260—65 |

LESTER L. LEE, Primary Examiner

U.S. Cl. X.R.

117—124 E; 161—197; 260—32.6 N, 47 CP, 65, 775 R, 327 H, 346.1 R, 347.7, 453 AR, 570.5 R, 570.5 C, 570.5 S, 857

UNITED STATES PATENT OFFICE
CERTIFICATE OF CORRECTION

Patent No. 3,772,254            Dated November 13, 1973

Inventor(s) Robert J. Jones and Eugene A. Burns

It is certified that error appears in the above-identified patent and that said Letters Patent are hereby corrected as shown below:

Col. 2, line 63     isocylanate should read -- isocyanate --;

Col. 4, line 66     delete entirely and substitute therefor

-- allyl isocyanate --;

Col. 5, line 60     correct "diamine" to read -- diamino --;

line 69     delete "3,3'-dimethyl-4,4'-";

line 70     before "biphenyl diamine" insert

-- 3,3'-dimethyl-4,4'- --;

Col. 6, line 1     correct "metaphenylene" to read

-- meta-phenylene --;

line 41     correct line to read as follows:

-- p,p'-diphenyl methane diisocyanate --.

Signed and sealed this 17th day of December 1974.

(SEAL)
Attest:

McCOY M. GIBSON JR.            C. MARSHALL DANN
Attesting Officer               Commissioner of Patents